(12) United States Patent
Siercks

(10) Patent No.: US 7,586,585 B2
(45) Date of Patent: Sep. 8, 2009

(54) HAND-HELD SURVEYING DEVICE AND SURVEYING METHOD FOR SUCH A SURVEYING DEVICE

(75) Inventor: Knut Siercks, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/721,154

(22) PCT Filed: Dec. 7, 2005

(86) PCT No.: PCT/EP2005/056589

§ 371 (c)(1),
(2), (4) Date: Jul. 16, 2007

(87) PCT Pub. No.: WO2006/061407

PCT Pub. Date: Jun. 15, 2006

(65) Prior Publication Data

US 2008/0231827 A1    Sep. 25, 2008

(30) Foreign Application Priority Data

Dec. 11, 2004  (EP) .................................. 04029523

(51) Int. Cl.
*G01C 3/08* (2006.01)
(52) U.S. Cl. ...................................... 356/4.01
(58) Field of Classification Search ........... 356/3.01–22
See application file for complete search history.

(56) References Cited

U.S. PATENT DOCUMENTS

| 5,291,262 A | * | 3/1994 | Dunne ........................ 356/5.06 |
| 5,337,149 A | | 8/1994 | Kozah et al. |
| 5,886,775 A | * | 3/1999 | Houser et al. ............... 356/4.01 |

FOREIGN PATENT DOCUMENTS

| DE | 38 39 797 | 7/1989 |
| EP | 0 738 899 | 10/1996 |
| EP | 1 205 763 | 5/2002 |
| EP | 1 517 117 | 3/2005 |
| WO | WO 97/40342 | 10/1997 |

* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

The invention relates to a hand-held measuring device (1a), comprising at least one rangefinder, embodied with integration of a positional detection component such that the positional detection component records the position (GP1,GPn) of the measuring device (1a) and the orientation of the rangefinder for each rangefinder measurement, whereby an automatically-controlled sequence of rangefinder measurements with corresponding positions (GP1,GPn) and orientations may be generated. All rangefinder measurements are recorded and correlated as field points (AP1,APn) in the form of a trace (SP) by means of said linked recording, such that complex calculations, such as for example, the measurement of inaccessible objects or the determination of the planarity of a surface are possible.

27 Claims, 4 Drawing Sheets

HAND-HELD SURVEYING DEVICE AND SURVEYING METHOD FOR SUCH A SURVEYING DEVICE

The invention relates to a hand-held surveying device according to the pre-characterizing clause of claim 1 and a surveying method for such a surveying device according to the pre-characterizing clause of claim 10.

In many applications, methods and systems for distance measurement are used. Examples of this are extremely precise surveys in geodetic applications, but also measuring tasks in the area of building installation or for military purposes. For these tasks, hand-held surveying devices which carry out an optical distance measurement to a selected field point are used. Here, generally a laser beam is emitted and is received again and evaluated after deflection by the target. Various measuring principles, such as, for example, phase or transit time measurement, are available for determining the distance.

A typical surveying device suitable for such applications is described, for example, in EP 0 738 899 B1.

In many applications, it is desirable to carry out distance measurements which are automatically associated with the position and/or orientation of the measurement. This results in easier handling since there is no need for repeated fixing of the measuring device to a reference point.

For example, U.S. Pat. No. 5,337,149 discloses a hand-held rangefinder with inertial sensors, which links the distance measurement to the actual position.

U.S. Pat. No. 5,886,775 describes a scanning process for an object. The position determination of the hand-held scanner used is effected here electromagnetically.

Although such distance-measuring systems permit the linking of distance measurement and determination of spatial variables, such as position and orientation, at the time of measurement, the recording of larger numbers of measurements, as required, for example, in the scanning of extensive objects, remains problematic.

This is the case, for example, if the distance between two edges of a table is to be measured without contact being possible. In addition, even with suitable measuring points, access for the measurement is not always available. Thus, for example, measurement of pipelines running along a high ceiling with regard to their thickness is not possible by means of surveying devices of the prior art. However, these objects and their properties can be surveyed from a relatively large number of measurements if they are determined with respect to their measuring conditions and have a cohesion as a spatial sequence of starting points of the measurement.

The disadvantage of apparatuses to date is the poor coherence or the lack of spatial relationship of the various measurements, in particular the uniformity of the distribution of starting locations of the measurements. Thus, a plurality of distance measurements are not automatically correlated with one another on recording. However, such correlations are suitable, for example, for checking the parallelism of two structures, such as, for example, two walls. A fundamental problem of such a linkage is due to the multiplicity of measurements which in each case have to be separately oriented and initiated, but all measurements should advantageously have a spatial cohesion, i.e. must be carried out with close spatial coordination with one another or adjacent to one another.

An object is to permit a high spatial cohesion of a plurality of measurements, in particular of a multiplicity of measurements, for hand-held surveying devices or methods.

A further object is to provide a hand-held surveying device and a surveying method suitable for this purpose, by means of which properties of extensive or three-dimensional structures can also be surveyed or checked or structures can be identified.

These objects are achieved by the subjects of claims 1 and 10 or of the dependent claims or the achievements are further developed.

The basis of the invention is that distance measurements are recorded automatically and with linkage together with the coordinated parameters of the location and the orientation of the axis of the rangefinder. The recorded data records comprising distance and coordinated parameters can then be directly further processed or temporarily stored. The recording of the data records is effected by an automated measuring sequence. By initiating the measurement, a sequence of distance measurements with associated orientation and position determination is generated by the device.

The repetition rate is chosen so that a dense sequence of measurements arises whose frequency and spatial relationship permit determination of surfaces too by scanning. The scanning is effected here by manual movement of the measuring device, it being possible for this movement to include arbitrary and involuntary components. In particular, the use of the physiological tremor of the human hand permits fine scanning if the measurements are initiated with appropriate adaptation. Depending on the distance, the tremor can be used as the only movement of the hand in order to scan relatively small targets so that the scanning determination is effected without arbitrary movement.

By means of the automated and optionally optimized recording, data sets for a multiplicity of distance measurements are recorded rapidly and precisely and can subsequently be evaluated by more complex methods, for example also statistical approaches or methods of pattern detection.

The repetition rate of the automatically generated measurements can be adapted as a function of target distance or changes in position or in orientation. Thus, for example, the "density" or time sequence of the measurements can be varied as a function of the target distance and/or the manual scanning speed. Optionally however, it is also possible to take into account information about the scanned target object. If, for example, the continuously recorded distance measurements show a large scatter of the distance values, a structured surface may be assumed and the repetition rate can be increased for achieving higher resolutions. If the variance of the measured values then falls below a threshold again, the repetition rate can be correspondingly reduced. In a similar manner, the repetition rate can be varied as a function of the angular acceleration or lateral movement of the measuring device in order to maintain a correspondingly uniform or dense coverage.

The distance measurement can be carried out using the laser rangefinders typically used in hand-held surveying devices. In principle, however, it is also possible according to the invention to use other systems provided that they permit identification and spatial allocation of the surveyed points to the surveying device, such as, for example, triangulation meters.

For each distance measurement, the orientation of the beam path used for this purpose and the position of the surveying device are recorded. The determination of orientation and position can be effected by various methods. In particular, according to the invention, the change in the orientation and position can be determined so that only relative parameters are measured. These must be related back to the starting point of the entire measuring method when an absolute determination is required. In many applications, however, an absolute position of the parameter to be obtained is not required. Thus, in the case of the above-described measurement of the distance between two edges, it is sufficient to determine only the edges and their distance and position relative to the surveying device. From the set of measurements which are spatially related to one another, the spacing of the edges can be calculated. An automated reference to a known absolute position is not required in this case since the allocation of distance to object is effected by the user. Thus, it is sufficient for many purposes if the measurements are known with regard to their position and orientation to one another.

According to the invention, it is of course also possible to determine the absolute position or orientation in space for each measurement or a few measurements so that the measurements are not only correlated with one another but are also exactly fixed in space. This permits subsequent use in a further measuring sequence independent of the first series or the transfer to other systems.

The method according to the invention provides a large number of correlated measurements so that even more complex evaluation methods can be used. For example, it is possible by known methods to identify objects in a point cloud of individual measurements and to determine the dimensions or orientation of said objects. Such methods are described, for example, in WO 97/40342.

To date, however, such point clouds were recorded by fixed scanner systems. For these systems, it was necessary to choose a fixed erection point which served as a basis of a scanning process effected by motors. Complexity, size and energy consumption prohibited such hardware for hand-held operation, as did the requirement of fixed erection.

According to the invention, the present invention uses the movement of the hand for achieving a scanning measuring process. Here, both the tremor as an involuntary movement of the hand which is present in any case and a conscious movement are used for achieving a manual scanning process.

Depending on the application, different frequencies of the tremor may occur. The normal, physiological tremor has frequencies in the range of 4 to about 12 Hz, depending on conditions such as, for example, in the case of rest tremor, kinetic tremor, holding tremor or isometric tremor, the physiological tremor in young people being in the range of 8-12 Hz. A repetition rate of the distance measurements and position and orientation measurements linked therewith which corresponds to the tremor frequency or exceeds it already utilises the involuntary movements of the hand for the scanning determination.

In addition to the scanning movement of the hand, a scanning movement of the beam used for the distance measurement can be technically produced. This can be effected, for example, in a fan-like or funnel-like manner and can be produced, for example, by piezoelectrically moved elements in the beam path. In addition to the manually generated scanning movement, there is a superposed scanning emission generated by the apparatus or one having a plurality of measuring lobes which permit the production of parallel or zig zag traces of measuring points on the target object and hence improved scanning.

The scanning movement produces a continuous change in the emission direction and the position of the surveying device. The parameters to be determined for each distance measurement can be determined by internal systems which determine the relative variables as changes of reference variables or as acting forces or accelerations. This is possible, for example, with inertial sensors. These measure rotational and translational accelerations. As a result of the integratability on substrates, for example by known methods of microsystem engineering, for example by micro- or nanostructuring, compact, robust and energy-saving sensor systems which permit use in hand-held surveying systems are now available.

Inertial sensors have in particular the advantages of a high usable frequency so that good resolution with respect to time and hence also space can be achieved. In addition, the surveying device can be used without a visual connection to identifiable points and the device may have a closed, encapsulated design.

Alternatively or in addition, however, orientation relative to external variables, for example identifiable points or structures, is also possible. If the position of these reference points determined by the surveying device is known, the actual absolute position of this device can be deduced. In order to permit the actual position as the present location of the surveying device under all conditions with the required accuracy, methods are known which are based on a determination of the position of the device itself with respect to objects as reference objects or reference points which are known with regard to their position. An example of this is the classical method of resection. If it is intended to derive absolute positions for a surveying device or a positioning device suitable for this purpose from the knowledge of reference points, the reference points must be established beforehand and surveyed with sufficient accuracy.

However, even without a knowledge of the absolute position of these reference points, it is always possible to consider the relative position, i.e. the change referred to these points, so that a relative positioning or orientation of the measuring axis is possible, which permits correlation of the various distance measurements.

Systems suitable for this purpose are known, for example, by the name local positioning systems and use microwaves or optical radiation for measurement relative to the reference points. Such a system comprising an optical determination of external reference points is described, for example, in the European patent application no. 03021134 not yet published on the date of filing.

The advantage of the externally referencing systems is in particular their ability to determine the absolute position.

According to the invention, an inertial sensor can also be combined with an externally referencing system in a surveying device, even if this does not have the required resolution of the respective space or time. Thus, inertial sensors which measure, for example, rotation rates and linear accelerations frequently have drifts which lead to deviation of the measured actual position from the true position. A surveying device according to the invention then offers a suitable correction function which corrects deviations at certain time intervals by external determinations of the actual position. On the other hand, periods between the low-frequency steps of the external positioning system can be supported by a position determination by means of inertial sensors. The intermittent loss of the determination of reference points can also be bridged by a further positioning system so that either the number of reference points can be reduced and/or the range accessible to measurements can be briefly extended. Such a hybrid system can thus also compensate the brief loss of a visual connection to reference points, so that the area of use is generally enlarged and the surveying device is more robustly designed with regard to its use.

The measurements which can be linked or are correlated with one another in such a manner via the position and orientation information can, according to the invention, be evaluated by a multiplicity of approaches, for example from image processing, pattern recognition or signal processing and statistical methods.

Below, two examples typical of general applications in the construction sector or the surveying of buildings are explained in more detail.

A. Surveying of a raised structure bounded by edges, for Example a Table Top

In a first step, the automatic measurement of multiple distances is effected, the surveying device being moved coarsely over a solid angle which includes the table top. The sequence of measurements is automatically generated, it being possible to initiate the sequence manually or automatically. A frequency or repetition rate is specified or automatically adapted, for example on the basis of the speed of lateral or rotational movement.

From the set of measurements, the edges are now determined in a second step. These can be identified automatically, for example on the basis of jumps in the measured distances, or manually. The manual identification can be effected, for example, by carrying out a plurality of measurements directly to the edge, which are identified additionally as edge measurements. From these measurements, a three-dimensional edge position is then determined, for example by calculating the mean value.

In a third step, a distance is determined from the three-dimensional edge position and output as the width of the table top.

In these steps, it is possible in each case to use different, known statistical methods in order to obtain a distance with a pre-determined accuracy from a multiplicity of measurements.

The recording of the measurements can also be controlled by taking into account a preliminary estimate of the accuracy to be achieved with the results. Thus, in the case of unfavourable conditions, it is possible to indicate to the user that the number of measurements is not yet sufficient and the measuring process must be extended. Alternatively or in addition, an automatic adaptation of the repetition rate or measuring frequency can also be effected.

The edge identified in the surveying of a table top, described here by way of example, and determined with respect to its three-dimensional position can be used in further steps in order to identify or to define complete objects. If a plurality of edges are surveyed in succession as structural elements the position and orientation of the structural elements is also known or can be derived from the positional and directional information linked to the measurement, so that related objects can be constructed or recognised. For example, the above-cited methods of image processing or of laser scanner technology are available for this purpose.

B. Surveying of a Surface with Regard to its Planarity, for Example of a Wall in an Interior For surveying the surface, the first step of the example described above is carried out analogously.

From the totality of the measurements, the flatness of the wall can then be derived in a second step directly statistically or in stages. For the direct statistical determination, for example, it is possible to use the least squares method, which places a plane through the cloud of measured values and minimizes the deviation of the measured values from this plane. The flatness of the plane can be concluded from the mean deviation. The plane is thus defined as running between the steps.

In a multistage method, for example, it is possible first to determine the path of an abstract plane, which is effected, for example, so that all measured values lie spatially on that side of the plane which faces the rangefinder.

The deviation of the measured values from the ideal, virtual path of the plane is then derived and the flatness of the plane thus determined.

In most applications, it is likely to be advantageous if preliminary information about the topology to be analysed is specified or automatically determined before the evaluation. A specification can be effected, for example, by manual selection from a menu which has for the above examples the points "determine width" or "planarity of a plane", so that a procedure in the analysis or mathematical algorithm is already defined.

Alternatively or in addition, automated provision of preliminary information can also be effected. Thus, the surveying device may contain an image-recording component for supporting an allocation of objects to the distance measurements, for example in the form of a camera. In relation to the measurements, an image of the surveyed segment of space is recorded, from which the topology of the object to be surveyed is then automatically derived. Efficient algorithms or apparatuses for pattern detection are available for this purpose in the prior art. Determination of the objects interactively from the image information and the measured results can also be effected here. Thus, for example, jumps in the measured distances can be used for identification of edges in a recorded image.

On the basis of the automated linkage of measurements in dense sequence, the surveying device or surveying method according to the invention can be used in particular for determining, verifying and/or measuring angles between planes, distances between edges or bounding surfaces of three-dimensional objects, properties of three-dimensional objects, parallelisms of surfaces or planarities of surfaces.

The surveying device according to the invention and a surveying method according to the invention are described in more detail or explained purely by way of example below with reference to working examples shown schematically in the drawing. Specifically, FIGS. 1a-b show the outside view of two possible embodiments of the surveying device according to the invention comprising inertial sensors and external referencing;

FIGS. 2a-b show the diagram of the design of two possible embodiments of the surveying device according to the invention comprising inertial sensors and external referencing;

Figure 1A:
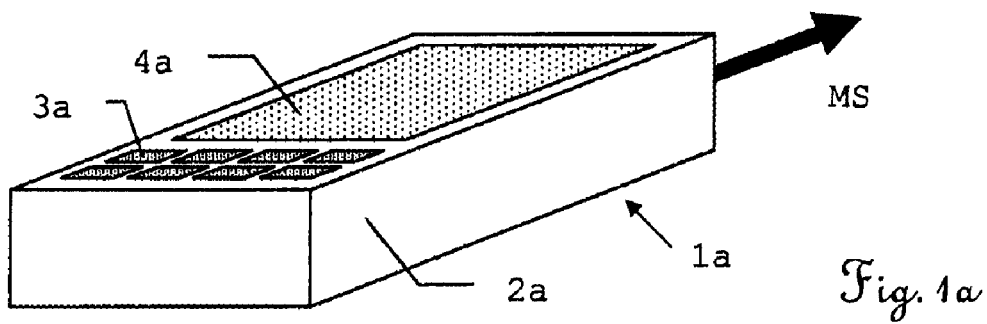
Figure 1B:
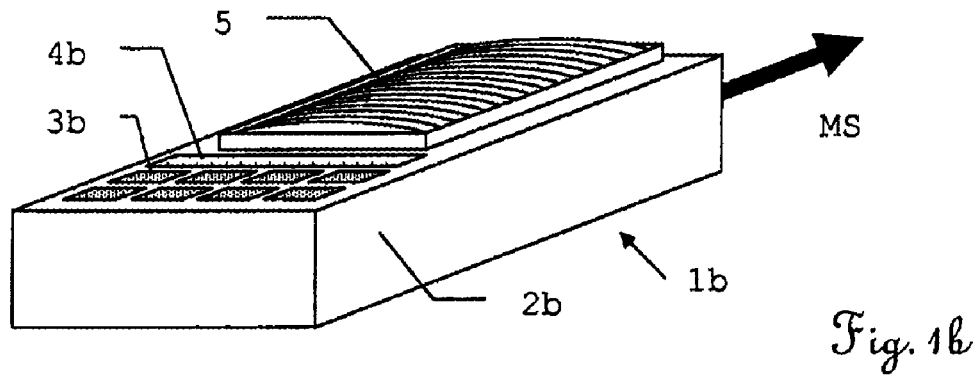

FIGS. 1a-b show the outside view of two possible embodiments of a surveying device according to the invention comprising inertial sensors and external referencing. The first embodiment 1a of the surveying device in FIG. 1a puses one or more inertial sensors as a position detection component and has a housing 2a which carries input and control keys 3a and a display field 4a on its surface as controls. By means of these controls, the functionality of the surveying device can be controlled; in particular, a choice of standard objects can be made. For distance measurement, the surveying device has a radiation source which emits measuring radiation MS.

FIG. 1b shows a second embodiment 1b of the surveying device according to the invention comprising a position determination by referencing with respect to external, identifiable points. For this purpose, radiation for identifying and surveying identifiable reference points is emitted via a cover 5 which is transparent to radiation and is mounted on the housing 2b of the surveying device. Thus, an optical system which references itself with respect to external points is used as a position detection component. Input and control keys 3b and a display field 4b are arranged on the surface of the housing as controls. For distance measurement, measuring radiation MS is emitted.

Instead of the distance measurement with radiation emission, however, another suitable rangefinder, for example a triangulation meter, can also be used according to the invention for all embodiments.

Figure 2A:
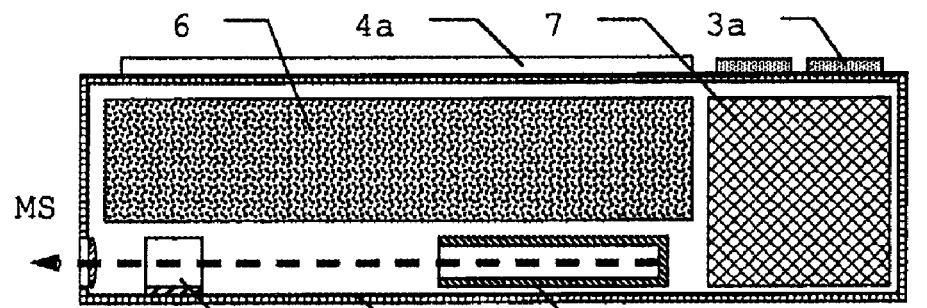
Figure 2B:
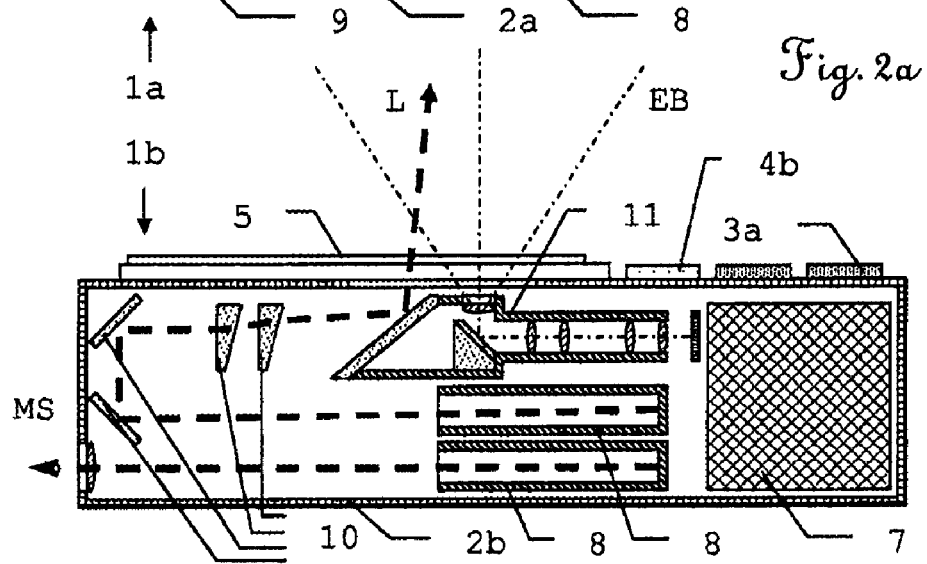

FIGS. 2a-b schematically show the internal design of the two possible embodiments of the surveying device according to the invention from FIGS. 1a-b comprising inertial sensors and external referencing.

The design of the first embodiment 1a is explained in FIG. 2a. The housing 2a carries input and control keys 3a and a display field 4a on the top. An inertial sensor 6 as a position detection component and a computing unit 7 for control, in particular automatic initiation of the distance measurement, and for derivation of a variable to be measured, in particular a distance, from the measured distances are present inside the housing 2a. For the distance measurement, in this first embodiment 1a measuring radiation MS is produced by a radiation source 8 and emitted by the surveying device. The emission of the measuring radiation can be influenced in its emission direction by an optical element 9 in the beam path. For example, a mirror can be adjusted by a piezoelement so that the measuring radiation passed via the mirror is emitted and optionally also received in an angular range as a scanning fan. After reflection by a target, this radiation is received again by a receiver which is not shown here, and the signal obtained is evaluated in the computer unit 7. By means of the computer unit 7, each distance measurement is linked to the position of the surveying device provided by the inertial sensor 6 and the orientation of the rangefinder.

The assignment of the emission direction established by the scanning movement can be measured directly or indirectly and hence registered as orientation of the rangefinder. A direct measurement represents, for example, the registration of the exact position of the optical element 9 by means of circuitry in the case of the respective emission, whereas an indirect determination is possible by the determination of the time of the emission. From this time and the knowledge of the period for a complete scan cycle, the position of the optical element 9 at the emission time can be derived computationally.

The variation in the direction of the distance measurement is not limited to the emission of radiation. Instead of an emission direction, it is possible according to the invention also to vary, for example, the receiving direction of a sensor, for example of a triangulation meter, so that even purely passive systems can be used for the distance measurement.

FIG. 2b shows the second embodiment 1b of the surveying device according to the invention, comprising housing 2b, the input and control keys 3b, a display field 4b and the components present in the housing. In a manner analogous to the first embodiment, measuring radiation MS is produced by a radiation source 8 and emitted by the surveying device, received again and finally evaluated. In the second embodiment 1b, too, an optical element can be provided in the beam path.

For the determination of the position of the surveying device and the orientation of the rangefinder, external referencing is used purely by way of example in the second embodiment. Laser radiation L is emitted by a positioning radiation source 8' and is fed via deflecting elements and a rotatable pair of prisms as optical guide elements 10 a control element and is emitted through the cover 5 which is transparent to radiation. By means of the rotatable pair of prisms, the angle at which the laser radiation L strikes the mirror is varied periodically so that a rosette-like scanning movement by the laser beam L emitted through the cover 5 results. The laser radiation reflected back by a target, in particular a reference point, is returned via the same beam path to the positioning radiation source 8' into which a receiver for the distance measurement is structurally integrated here.

The radiation reflected back from a reference point located within the detection range EB is also fed, via an optical system in the form of endoscope 11, to a camera as an image-recording component. By means of this camera, determination of the reference points and the identification thereof by image processing methods is permitted in parallel with the distance measurement. Here, an angle measurement can be carried out in particular by counting the image points located between two reference points.

For control and data processing, the second embodiment 1b has a computing unit 7'. In addition to the functions for distance measurement by means of the measuring radiation, the computing unit 7' has the functionality for automatic detection of detectable reference points and for the derivation of position information of the reference points and a position component for the derivation of the position of the surveying device and the orientation of the rangefinder from the position information of the reference points. The computing unit 7' links each distance measurement to the actual position of the surveying device in each case at the time of the distance measurement and to the orientation of the rangefinder.

According to the invention, the surveying device may also have both inertial sensors and components for external referencing and may thus combine the properties of the first and second embodiments.

Owing to the dimensions of hand-held surveying devices, as well as the components thereof, and small cross-sections of the points to be surveyed, the highly accurate and stable positioning is a critical requirement. Advantageously, all components of the radiation source, beam guidance, inertial sensors and the controlling and evaluating components can be mounted on a common base plate or realized on a common substrate. An optical structural element or assembly particularly suitable with regard to mounting requirements and the required positional accuracy, as components, and a total system are described in DE 195 33 426 A1 and EP 1 127 287 B1. WO 99/26754 and European patent application EP 1 424 156 describe suitable methods for soldering miniaturized assemblies on a base plate. A suitable method for fixing a miniaturized assembly on a support plate, in particular for the precise adjustment of optical components, is described in European patent application EP 1 424 884.

Figure 3:
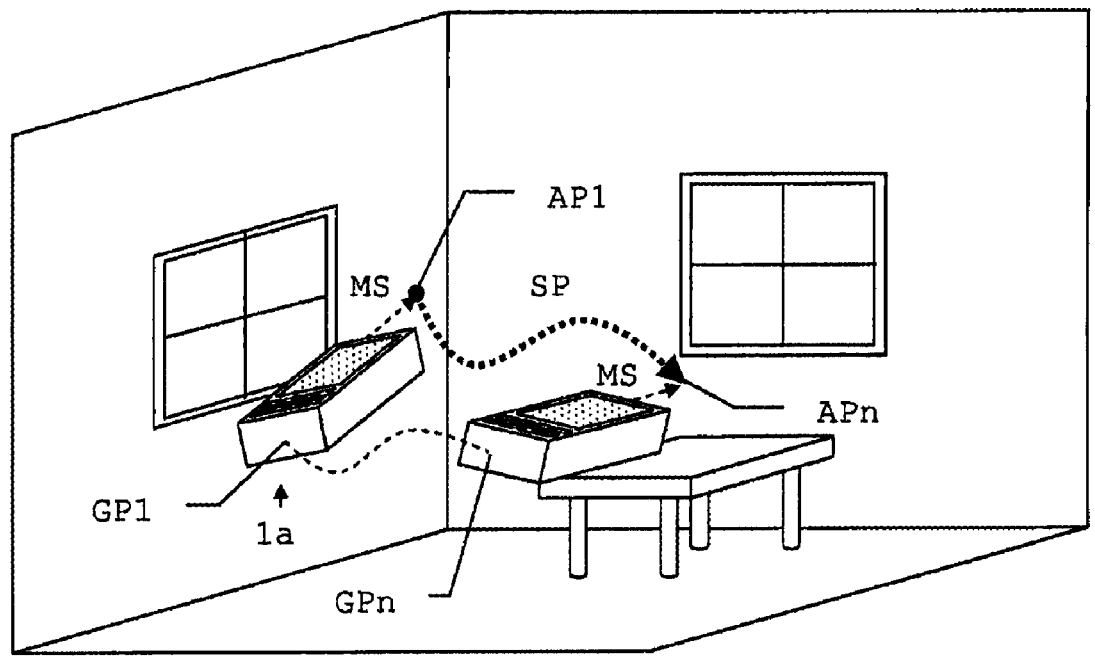
FIG. 3 shows the explanatory diagram of the surveying method according to the invention.

FIG. 3 explains the surveying method according to the invention for the example of the use of the first embodiment 1a. At a first device position GP1, a distance measurement is effected by the emission of measuring radiation to a field point AP1. At this position, the measured distance together with the position and the orientation of the rangefinder are recorded with linkage and optionally stored by the surveying device. By means of the arbitrary and/or involuntary movement of the human hand, the surveying device is moved in space up to a device position GPn. The sequence of distance measurements which is coordinated with the emitted measuring radiation forms a trace SP of field points APn. For each distance measurement and the field point APn coordinated with it, distance, device position GPn of the surveying device and orientation of the rangefinder are recorded so that all distance measurements are linked and can be related to one another in three dimensions. The device positions GPn and orientations of the rangefinder can be determined absolutely in three dimensions or as a relative position or change with respect to the initial device position GP1 or the respective prior position or the respective orientation of the rangefinder. In this exemplary case, the actual device position GPn is determined as a change relative to the initial device position GP1 by the inertial sensor of the first embodiment 1a of the surveying device, the same applying to the orientation of the rangefinder.

Figure 4:
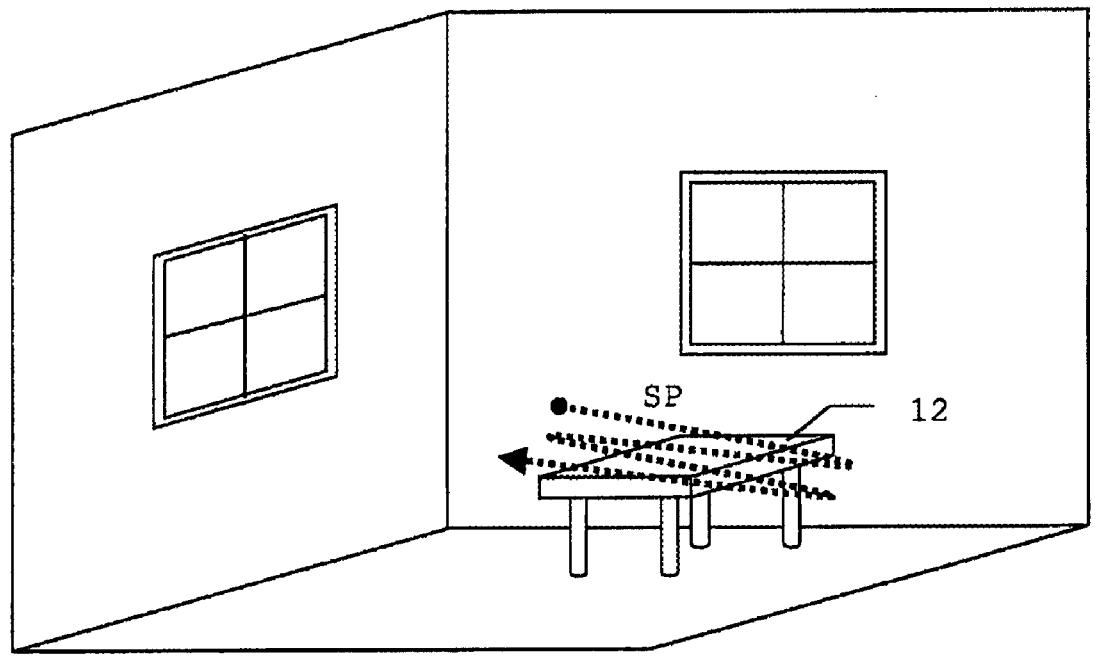
FIG. 4 shows a first example of surveying by the surveying method according to the invention.

FIG. 4 shows a first example of surveying by the surveying method according to the invention. A table 12 to be surveyed is present in a room. For conventional hand-held surveying devices, the edges of the table top are suitable neither as a support nor as a target which reflects back the measuring radiation. Measurement of the table width could be effected only with the use of aids, such as, for example, a straight edge as a support surface. For measurement of the table width, the surveying device according to the invention is manually moved by the method according to the invention so that its trace SP of field points with a distance measurement passes as far as possible several times over the table width.

Figure 5:
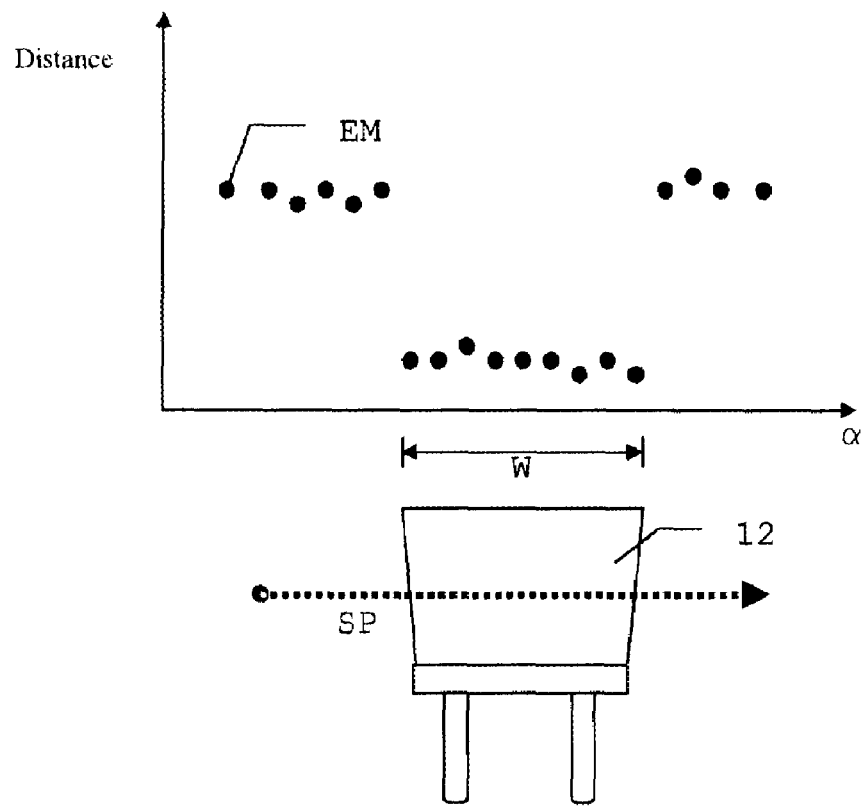
FIG. 5 shows an explanatory diagram for the derivation of a variable to be measured for the first example of surveying.

The evaluation of the data records thus obtained and comprising distance, position and orientation is shown in FIG. 5 by way of explanation as the derivation of a variable to be measured for a first example of surveying. For the sake of simplicity, a trace SP which is led only once over the width of the table 12 is considered, it also being possible to use the analysis for any number of passes. The distance measurements EM shown in the upper part of FIG. 5 are coordinated with the trace SP. A distance measurement which is coordinated with an angle α at which the distance measurement took place in three dimensions corresponds to each point of the diagram. Here, for the sake of simplicity, a measurement along a straight line parallel to the table surface is considered, so that the distance measurements EM can be configured on the basis of the angle α. The sequence of distance measurements now has jumps in the distances determined, which are correlated with the table edges. When the measurements reach the table top, the measured distance is smaller than in the case of a measurement from the floor of the room, which is lower. From the jumps in the distances in the sequence of distance measurements EM, it is now possible to derive an angle range with which, on the basis of the known distances, a spatial distance and hence a width W of the tabletop can be coordinated as a variable to be derived. Known and efficient methods are available for identifying such jumps or flanks in a sequence of measured values.

It is clear from the diagram that there is a relationship between the individual measurements and the accuracy of the variable to be derived. The spacing of the distance measurements in their sequence determines the possible accuracy of the measurement. Thus, according to the invention, it is possible to effect an optimization of the sequence of individual measurements, for example with regard to their time or space interval, which can be effected manually or automatically in the form of an upstream algorithm. For example, for achieving a sufficiently spatially dense distribution, the actual frequency of the measurements can be adapted to the speed of the movement of the human hand. The inertial sensor or the externally referencing system gives the required movement information for this purpose.

Figure 6:
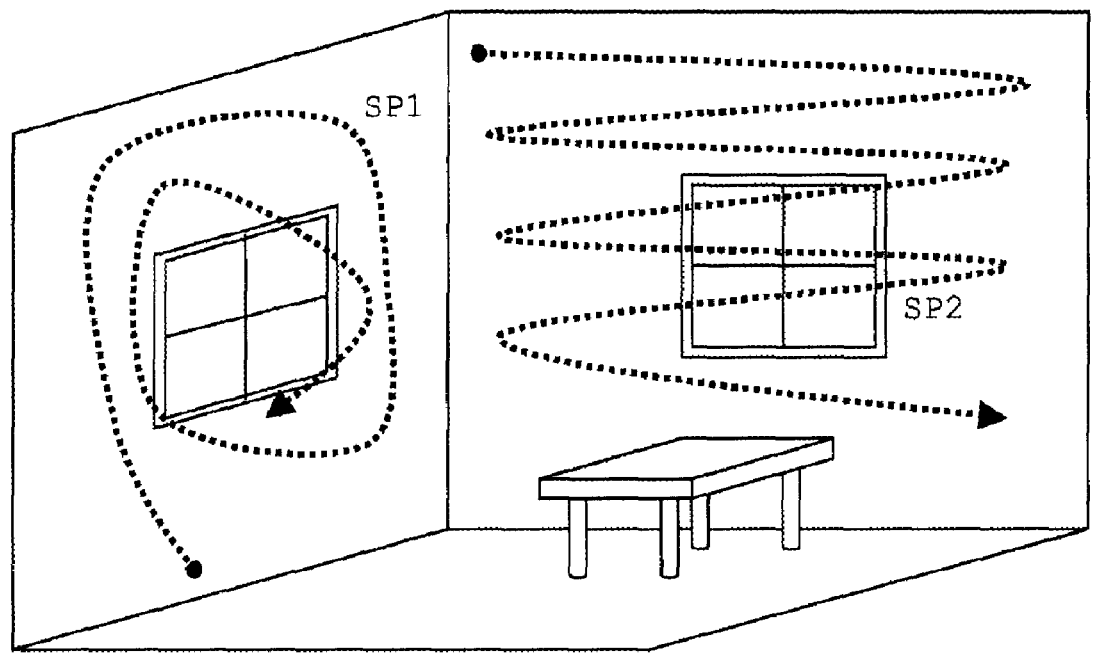
FIG. 6 shows a second example of surveying with the surveying method according to the invention.

FIG. 6 shows a second example of surveying with the surveying method according to the invention. In contrast to the first example from FIG. 4 and FIG. 5, an object is surveyed here with regard to the multidimensionality. In the second example, it is intended to check two walls with regard to their planarity or evenness for acceptance of building work in a room. For this purpose, each wall is scanned with a trace SP1 or SP2 of distance measurements. The analysis of the sequence of measured values in each trace can now be effected in such a way that, instead of surveying possible structures to be identified, the totality of all measured values is taken into account statistically. The sequence of measured values is used to derive a reference plane, relative to which a deviation is determined. A possible approach is the least squares method. However, alternatively or in addition, for example, the orientation of the surface can also be specified as being known. In this example, both walls are considered separately and the coordinated traces are evaluated in isolation.

Figure 7:
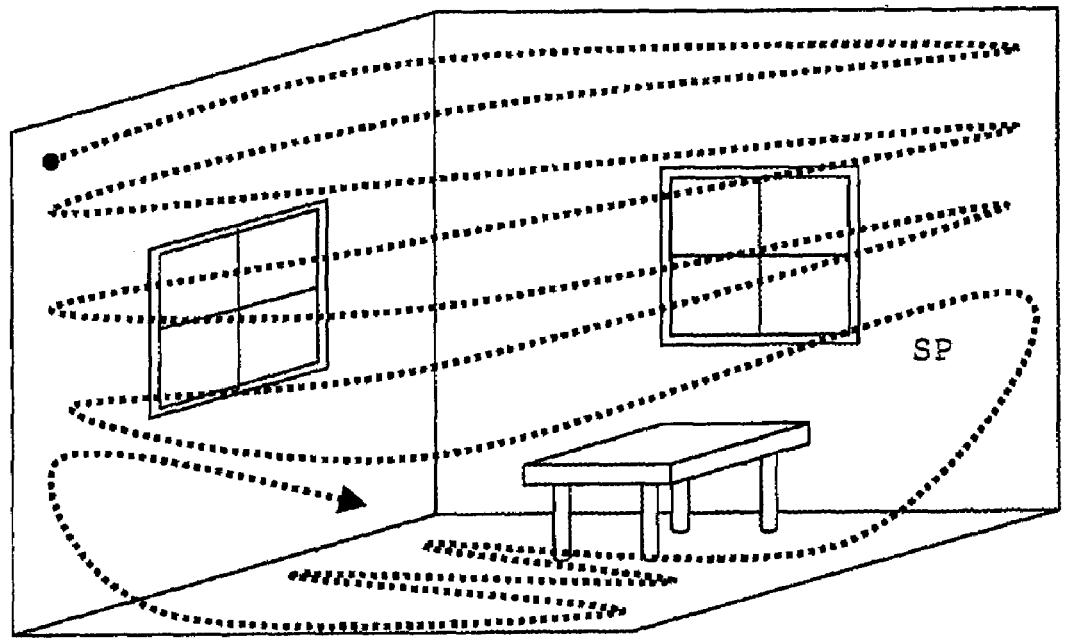
FIG. 7 shows a third example of surveying by the surveying method according to the invention.

FIG. 7 explains a third example of surveying by the surveying method according to the invention, in which the angles between two walls and the floor of a room are to be determined or checked. For this purpose, a trace SP is led over all surfaces to be analysed. The sequence of distance measurements now covers all surfaces.

In order to determine the angles, the surfaces can now be identified, i.e. a surface is coordinated with each measured value. For this purpose, information regarding the number and/or orientation of the surfaces can be specified or, in a first step, surfaces can be derived from the measured values, for example by a successive assignment of measuring points to sets which in each case represent one of the surfaces, on the basis of selection rules.

Alternatively, statistical methods, too, can permit simultaneous use of all measuring points for deriving the angles.

The recording of the trace SP can also be preceded by a preliminary measurement for identifying the surfaces, in which, for example, in each case a straight movement is made over the bounding surface of two planes. From the information that the respective trace must represent two surfaces, a comparatively rapid proportioning can be effected by dividing the trace into two sets. Since only one movement was effected, all measuring points are already sorted so that only the correct separation point, i.e. proportioning point, of the sets must be determined. For example, the least squares method can once again be used for the subsets, from which method the two surfaces follow.

Since a plurality of traces can also be spatially linked by the position detection component, however, it is also possible to effect a completely separate determination of surfaces, as shown in FIG. 6, and the subsequent relationship thereof for determining the angles.

Figure 8:
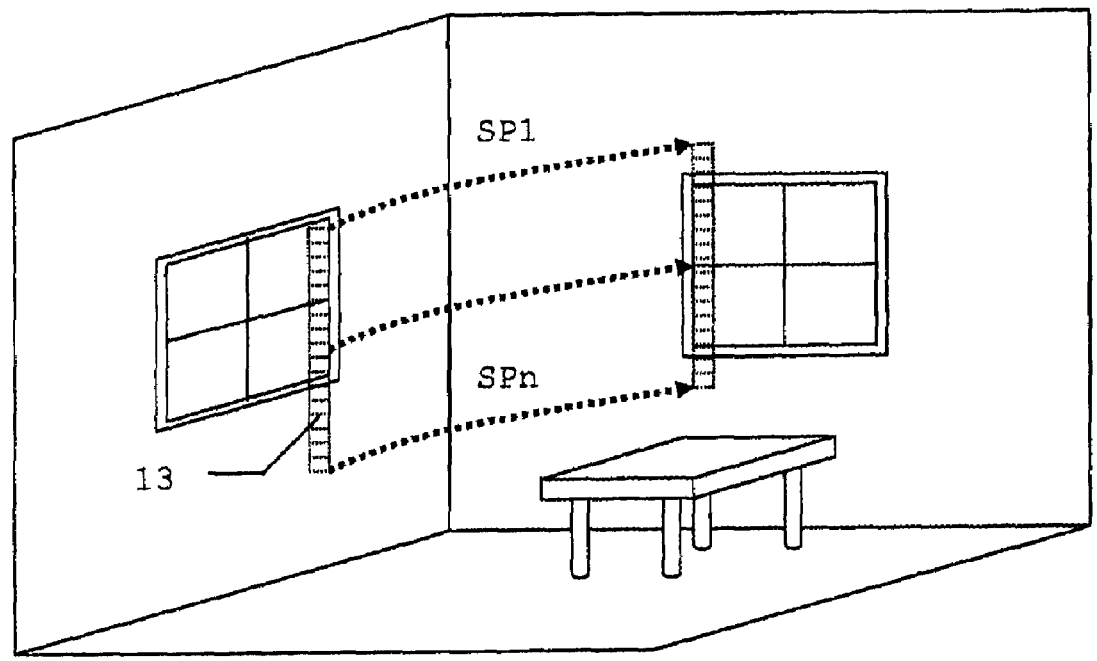
FIG. 8 shows a fourth example of surveying by the surveying method according to the invention.

The parallel production of a plurality of traces of distance-measuring points on the target object is shown in FIG. 8 for a fourth example of surveying by the surveying method according to the invention and a surveying device according to the invention with fan-like scanning effect. The surveying device used in this example corresponds to the first embodiment shown in FIG. 2a with the optical element in the beam path for the fan-like variation of the emission direction. By means of the optical element, no longer is only one point and hence one axis of the rangefinder coordinated with each orientation of the axis of the radiation source. Now, a periodic variation of the emission direction is produced so that, instead of only a single field point, a strip 13 of field points is surveyed. As in the method examples already explained, this strip is now passed through the room segment to be determined or surveyed. Thus, by a single manual movement from left to right, a multiplicity of traces SPn is produced instead of only a single trace SP1 as a sequence of field points, so that a two-dimensional field of field points is generated. In addition to the saving of time or manual effort, this field permits in particular more uniform scanning since there is a homogeneous distribution of the points within the strip. If the scanning speed in the strip 13 is applied so that the period for scanning the strip is small compared with the time scale of the manual movement, a comparatively densely and homogeneously scanned segment can be covered.

What is claimed is:

1. A hand-held surveying device, comprising:
   a rangefinder having an emission direction, and an evaluation component for deriving and providing measured distances;

a position detection component, the position detection component being formed, for each distance measurement, for linked recording:
of the respective position of the surveying device; and
of the respective orientation of the rangefinder; and
a rangefinder and position detection component being formed and arranged so that an automated sequence of distance measurements with a repetition rate can be initiated and the respective position and orientation being stored for each distance measurement of the sequence,
wherein the detection component is formed for recording changes in the position and/or in the emission direction caused by the involuntary movement of the hand, and the repetition rate is greater than the typical frequency of the rest tremor or holding tremor of the hand.

2. A surveying device according to claim 1, wherein the repetition rate is automatically varied as a function of
target distance,
change in position and/or
change in orientation.

3. A surveying device according to claim 1, wherein the position detection component is formed:
for recording a change of position and/or of emission direction;
for recording the absolute position and/or the absolute emission direction; and/or
as an inertial sensor for detecting linear and/or rotational accelerations.

4. A surveying device according to claim 1, wherein the position detection component is formed so that the position and/or emission direction can be derived by reference to reference points known with regard to their position.

5. A surveying device according to claim 1, wherein the position detection component has at least two detection levels of different time and/or space resolution.

6. A surveying device according to claim 1, wherein the emission direction is variable relative to the surveying device by means of a scanning element, it being possible for the actual emission direction relative to the surveying device to be included in the recording of the absolute and/or relative emission direction.

7. A surveying device according to claim 1, wherein the rangefinder is formed so that an emission takes place with an automatic scanning movement.

8. A surveying device according to claim 1, wherein an image-recording component supports recognition and/or coordination of objects with the distance measurements.

9. A surveying method for a hand-held surveying device according to claim 1, comprising the steps:
distance measurement of at least two distances, each distance being recorded with automatic linkage with the:
position of the surveying device; and
orientation of the rangefinder current at the time of the measurement;
derivation of a variable to be measured from the at least two measured distances;
an automated sequence of distance measurements being effected with a repetition rate and the respective position and orientation being stored for each distance measurement of the sequence,
wherein the repetition rate is greater than the typical frequency of the rest tremor or holding tremor of the hand.

10. A surveying method according to claim 9, wherein the repetition rate is varied as a function of
target distance;
change in position; and/or
change in orientation.

11. A surveying method according to claim 9, wherein the measured variables position and/or orientation are determined by:
registration of a change of these measured variables;
measurement of an absolute measurement variable; and/or
relation back to at least one point of known position.

12. A surveying method according to claim 9 wherein in the derivation of a variable to be measured, a distance is determined as width between at least two field points of the distance measurements.

13. A surveying method according to claim 9, wherein in the derivation of a variable to be measured, this is determined from a plurality of distance measurements, the distance measurements being correlated with geometric standard objects which are coordinated with the variable to be measured.

14. A surveying method according to claim 13, wherein the geometric standard objects are predetermined manually or automatically from a predetermined selection.

15. A surveying method according to claim 9, wherein the position and/or the orientation is determined with the use of at least two levels of different time and/or space resolution.

16. A surveying device according to claim 1, wherein the position detection component is formed, for each distance measurement, for linked recording in common storage.

17. A surveying device according to claim 1, wherein the rangefinder is a laser rangefinder.

18. A surveying device according to claim 1, wherein the repetition rate is a variable repetition rate.

19. A surveying device according to claim 1, wherein the repetition rate is greater than 4 Hz.

20. A surveying device according to claim 1, wherein the repetition rate is greater than 12 Hz.

21. A surveying device according to claim 1, wherein the position detection component is formed, for each distance measurement, for linked recording of the respective orientation of the emission direction of the rangefinder.

22. A surveying device according to claim 7, wherein the rangefinder is formed so that an emission takes place with an automatic scanning movement in the form of a fan.

23. A surveying method according to claim 9, wherein the derivation of a variable to be measured is of a distance variable from the at least two measured distances.

24. A surveying method according to claim 9, wherein the automated sequence of distance measurements is effected with a variable repetition rate and the respective position and orientation are stored for each distance measurement of the sequence.

25. A surveying method according to claim 9, wherein the repetition rate is greater than 4 Hz.

26. A surveying method according to claim 9, wherein the repetition rate is greater than 12 Hz.

27. A surveying method according to claim 9, wherein the measured variables position and/or orientation are determined by relation back to at least one point of known position by the resection method.

* * * * *